(12) United States Patent
Fujio et al.

(10) Patent No.: US 9,376,271 B2
(45) Date of Patent: Jun. 28, 2016

(54) ARTICLE TRANSPORT FACILITY

(71) Applicant: Daifuku Co., Ltd., Osaka-shi (JP)

(72) Inventors: Yoshihiko Fujio, Gamo-gun (JP); Takuya Isomura, Gamo-gun (JP)

(73) Assignee: Daifuku Co., Ltd., Osaka-shi (JP)

( * ) Notice: Subject to any disclaimer, the term of this patent is extended or adjusted under 35 U.S.C. 154(b) by 0 days.

(21) Appl. No.: 14/781,147

(22) PCT Filed: Mar. 28, 2014

(86) PCT No.: PCT/JP2014/059192
§ 371 (c)(1),
(2) Date: Sep. 29, 2015

(87) PCT Pub. No.: WO2014/157640
PCT Pub. Date: Oct. 2, 2014

(65) Prior Publication Data
US 2016/0046453 A1    Feb. 18, 2016

(30) Foreign Application Priority Data

Mar. 29, 2013    (JP) .................. 2013-074846

(51) Int. Cl.
| | | |
|---|---|---|
| *B65G 47/94* | (2006.01) | |
| *B65G 47/96* | (2006.01) | |
| *B65G 17/06* | (2006.01) | |
| *B65G 21/22* | (2006.01) | |
| *B65G 54/02* | (2006.01) | |

(52) U.S. Cl.
CPC ............ *B65G 47/962* (2013.01); *B65G 17/066* (2013.01); *B65G 21/22* (2013.01); *B65G 54/02* (2013.01)

(58) Field of Classification Search
CPC ...... B65G 17/066; B65G 21/22; B65G 35/06; B65G 47/962; B65G 54/02
USPC .................................................... 198/370.04
See application file for complete search history.

(56) References Cited

U.S. PATENT DOCUMENTS

| | | | | | |
|---|---|---|---|---|---|
| 3,577,928 A | * | 5/1971 | Victorri | ................. | B65G 23/00 104/292 |
| 5,054,601 A | * | 10/1991 | Sjogren | ................ | B65G 47/962 198/370.04 |
| 5,690,209 A | * | 11/1997 | Kofoed | ................ | B65G 17/345 198/370.03 |
| 6,736,254 B1 | * | 5/2004 | Fortenbery | ........... | B65G 47/962 198/370.03 |
| 6,799,672 B2 | * | 10/2004 | Wood | ................... | B65G 47/962 198/370.03 |
| 7,337,892 B2 | * | 3/2008 | Groot | ................... | B65G 17/066 198/369.3 |

FOREIGN PATENT DOCUMENTS

| | | |
|---|---|---|
| JP | 4811707 | 2/1973 |
| JP | 725440 A | 1/1995 |
| JP | 2011207599 A | 10/2011 |
| WO | 9830901 A2 | 7/1998 |

* cited by examiner

*Primary Examiner* — Leslie A Nicholson, III
*Assistant Examiner* — Keith R Campbell
(74) *Attorney, Agent, or Firm* — The Webb Law Firm

(57) ABSTRACT

An article transport facility allows transport carriages to travel with sufficient stability while avoiding damages to any transport carriage when the connection to another adjacent transport carriage is disengaged. Each of a plurality of transport carriages, which forms a carriage sequence, includes a carriage main body, a wheel which rolls on a travel surface formed along the travel path, a first connecting portion provided to a forward end portion of the carriage main body, and a second connecting portion provided to a back end portion of the carriage main body. The first connecting portion is connected to the second connecting portion of another transport carriage that is immediately in front so as to be pivotable about a carriage pivot axis extending along a vertical direction. The wheel is provided in the forward end portion of the carriage main body.

9 Claims, 10 Drawing Sheets

Fig.9
(a)
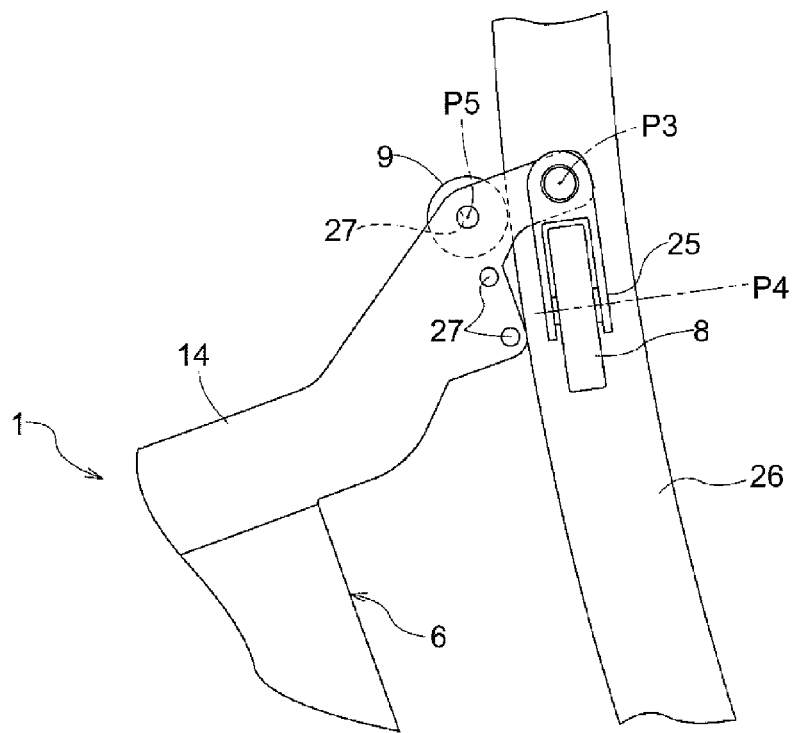
(b)
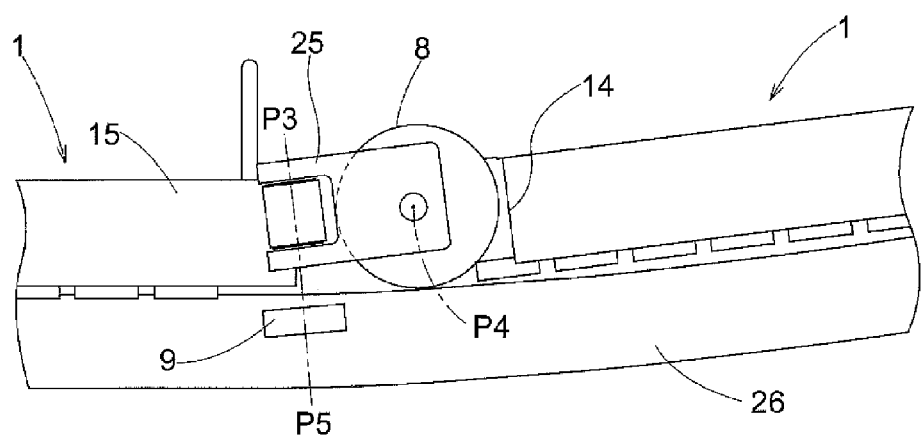

Fig. 10
(a)
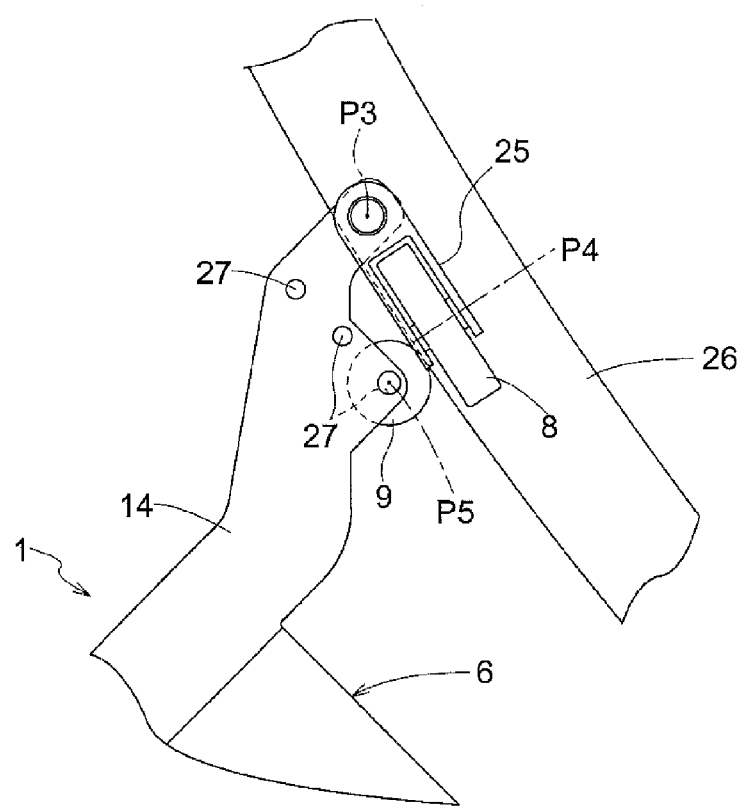
(b)
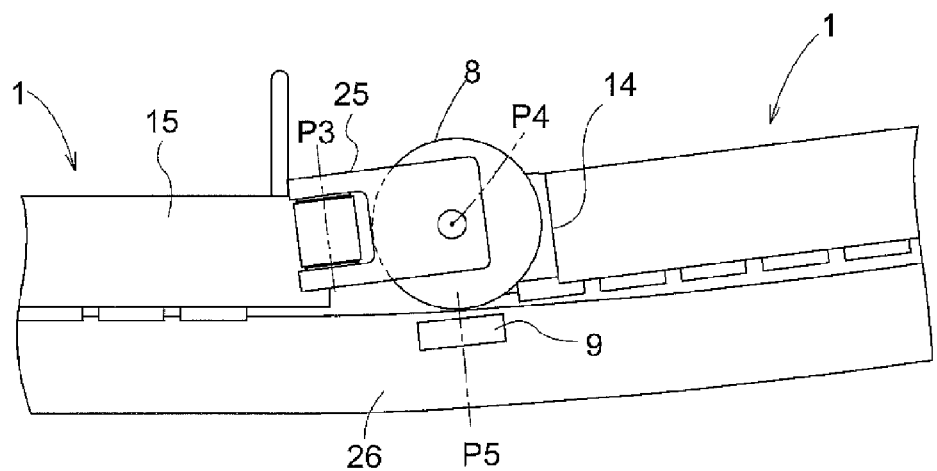

ARTICLE TRANSPORT FACILITY

CROSS-REFERENCE TO RELATED APPLICATIONS

This application is the United States national phase of International Application No. PCT/JP2014/059192 filed Mar. 28, 2014, and claims priority to Japanese Patent Application No. 2013-074846 filed Mar. 29, 2013, the disclosures of which are hereby incorporated in their entirety by reference.

TECHNICAL FIELD

The present invention relates to an article transport facility comprising a carriage sequence which is a plurality of transport carriages, for transporting articles, connected together along a travel path, the plurality of transport carriages being capable of traveling along the travel path; and a driving device for causing the carriage sequence to travel along the travel path, wherein each of the plurality of transport carriages includes a carriage main body, a wheel which rolls on a travel surface formed along the travel path, a first connecting portion provided to a forward end portion of the carriage main body, and a second connecting portion provided to a back end portion of the carriage main body, and wherein the first connecting portion is connected to the second connecting portion of another transport carriage that is immediately in front so as to be pivotable about a carriage pivot axis extending along a vertical direction.

BACKGROUND ART

An article transport facility, such as one described above, is one in which a carriage sequence is formed by a plurality of transport carriages with a first connecting portion of a transport carriage being connected to a second connecting portion of another transport carriage that is immediately in front, and in which the carriage sequence is caused to travel along a travel path by means of an driving device to transport articles. And conventional examples of such an article transport facility include an example in which the wheels that roll on the travel surfaces are provided in a back end portion of the carriage main body (see, for example, Patent Document 1) and another example in which the wheels are provided in a front end portion of the transport carriage (see, for example, Patent Document 2).

PRIOR ART DOCUMENTS

Patent Documents

Patent Document 1: JP Publication of Application No. 2011-207599
Patent Document 2: International Publication WO1998/030901 (see SUMMARY OF THE INVENTION)

Problems to be Solved by the Invention

When the wheels are provided in the back end portion of the carriage main body as in the article transport facility of Patent Document 1, the forward end portion of the carriage main body is supported only by the connection to the second connecting portion of the transport carriage that is immediately in front. As such, as shown in FIG. 12, if the connection between a transport carriage 1a and a transport carriage 1b that is immediately in front is disengaged, the forward end portion of transport carriage 1a in the back drops and the transport carriage 1a in the back comes to assume a head-low attitude. If the transport carriage 1a in the back assumes such a head-low attitude during travel, the forward end portion of the transport carriage 1a in the back may be thrusted into, as it comes into contact with, any unevenness and structure that may exist on the floor on which the travel path is installed, which may cause damage to the transport carriage 1a in the back and other transport carriages that may follow.

In addition, in the article transport facility of Patent Document 2, the wheels are provided in the forward end portion of the carriage main body; thus, the forward end portion of the carriage main body is supported by the connection to the second connecting portion of the transport carriage that is immediately in front, as well as by the wheels. So, the problem described above would not occur. Incidentally, although the back end portion of the carriage main body is supported only by the connection to the first connecting portion of the transport carriage that is immediately behind, the carriage main body comes to assume a tail-low attitude even if the connection is disengaged; thus, even if unevenness and structure existed on the floor, the back end portion of the carriage main body runs over the unevenness, etc., after the forward end portion of the carriage main body travels past it. Thus, the carriage main body can avoid being thrusted into the unevenness, etc., as it comes into contact with it even when the carriage main body comes into contact with it.

However, in the article transport facility of Patent Document 2, the wheels are located rearwardly of the first connecting portion. Thus, as shown in FIG. 13, when the travel path has a horizontal portion r1 and an inclined portion r2, and, for example, when the transport carriage travels through a connecting area between the inclined portion r2 and the horizontal portion r1, the first connecting portion 10a of the transport carriage 1a temporality dips lower (position shown with solid lines in FIG. 13) than its position when traveling in the horizontal portion r1 (position shown with dotted lines in FIG. 13), which causes a problem that the transport carriage cannot travel with sufficient stability.

To this end, a article transport facility is desired which can allow the transport carriages to travel with sufficient stability while avoiding damages to any transport carriage when the connection to another adjacent transport carriage is disengaged.

Means for Solving the Problems

An article transport facility in accordance with the present invention comprises: a carriage sequence which is a plurality of transport carriages, for transporting articles, connected together along a travel path, the plurality of transport carriages being capable of traveling along the travel path; and a driving device for causing the carriage sequence to travel along the travel path; wherein each of the plurality of transport carriages includes a carriage main body, a wheel which rolls on a travel surface formed along the travel path, a first connecting portion provided to a forward end portion of the carriage main body, and a second connecting portion provided to a back end portion of the carriage main body, wherein the first connecting portion is connected to the second connecting portion of another transport carriage that is immediately in front so as to be pivotable about a carriage pivot axis extending along a vertical direction, characterized in that the wheel is provided in the forward end portion of the carriage main body, wherein the wheel and the carriage pivot axis of the first connecting portion overlap with each other as seen along a carriage lateral direction.

That is, since the wheel is provided in the forward end portion of the carriage main body, even when the connection to the transport carriage that is immediately in front is disengaged, dropping of the forward end portion of the carriage main body can be prevented because the forward end portion of the carriage main body is supported by the wheel.

In addition, the carriage pivot axis of the first connecting portion overlaps with the wheel as seen along the carriage lateral direction; so, for example, when the travel path has a horizontal portion and a sloped portion, and when the carriage main body passes through the connecting area between the horizontal portion and the sloped portion, the timing at which the wheel passes through the connecting area and the timing at which the carriage pivot axis of the first connecting portion passes through the connecting area can be made close to each other. Thus, it becomes more difficult for the first connecting portion to move up and down with respect to the travel surface, allowing the travel transport carriage to travel with sufficient stability.

Examples of preferred embodiments of the present invention are described next.

In an embodiment of the article transport facility in accordance with the present invention, each of the plurality of transport carriages preferably includes a caster frame which is connected to the carriage main body such that the caster frame is rotatable about a wheel pivot axis which extends along the vertical direction when the transport carriage is in a horizontal attitude, wherein the caster frame rotatably preferably supports the wheel with a wheel rotation axis, which is a rotation axis of the wheel, located at a different position along a horizontal direction from the wheel pivot axis, and wherein, when the caster frame is in a straight travel state in which the wheel rotation axis is located rearwardly of the wheel pivot axis and in which the wheel rotation axis is in an attitude that is parallel to the carriage lateral direction, the wheel and the carriage pivot axis preferably overlap with each other as seen along the carriage lateral direction.

That is, when the travel direction of the transport carriage that has been traveling straight changes to a direction different from the straight direction, the caster frame rotates about the wheel pivot axis to change the direction of the wheel to the direction that corresponding to the travel direction of the transport carriage, thus making it possible for the transport carriage to travel in a desired direction with sufficient stability.

And the wheel supported by the caster frame has its wheel rotation axis located rearwardly of the wheel pivot axis in the straight travel state. However, by arranging such wheel and the carriage pivot axis to overlap with each other in the carriage lateral direction, it becomes difficult for the first connecting portion to move up and down with respect to the travel surface, thus making it possible for the transport carriage to travel with sufficient stability.

In an embodiment of the article transport facility in accordance with the present invention, the caster frame is preferably provided to each of the both end portions of the carriage main body with respect to the carriage lateral direction, wherein the first connecting portion is preferably provided in a central portion, along the carriage lateral direction, of the carriage main body, and wherein the forward end portion of the carriage main body is preferably formed to have a concave shape in which the central portion along the carriage lateral direction is located rearwardly of the both end portions.

That is, while it is desirable to provide the first connecting portion in the forward end of the carriage main body in order to make it easier for the first connecting portion to be connected to the second connecting portion of another transport carriage that is immediately in front, the wheel rotation axis of the wheel supported by the caster frame is located rearwardly of the wheel pivot axis in the straight travel state. Thus, the positional relationship is such that it is difficult to arrange the wheel and the carriage pivot axis of the first connecting portion to overlap with each other as seen along the carriage lateral direction.

To this end, it can be made easy to arrange the wheel and the carriage pivot axis of the first connecting portion to overlap with each other as seen along the carriage lateral direction, by forming the forward end portion of the carriage main body to have a concave shape in which the central portion along the carriage lateral direction is located rearwardly of the both end portions, and by providing the caster frame to each of the both end portions of the carriage main body, and by providing the first connecting portion in the central portion, along the carriage lateral direction, of the carriage main body.

In an embodiment of the article transport facility in accordance with the present invention, a travel rail is preferably provided along the travel path, a top surface of the travel rail defining the travel surface, wherein each of the plurality of transport carriage preferably includes a restriction member for restricting movement of the carriage main body along the carriage lateral direction by contacting a guide rail provided along the travel path, and wherein the restriction member is preferably provided at a pivot overlap location which overlaps with the wheel pivot axis as seen along the carriage lateral direction, in the straight travel state.

That is, since the restriction member is provided at the pivot overlap location which overlaps with the wheel pivot axis as seen along the carriage lateral direction, in the straight travel state, the restriction member and the wheel pivot axis are located close to each other; thus, the amount of pivoting of the caster frame about the wheel pivot axis can be reduced when the travel direction of the transport carriage that has been traveling straight changes to a direction different from the straight direction. Thus, it can be made difficult for the wheel to sway along the carriage lateral direction, thus making it difficult for the wheel to derail from the travel rail.

In an embodiment of the article transport facility in accordance with the present invention, the restriction member is preferably provided such that a position thereof along a carriage fore-and-aft direction can be changed between the pivot overlap location, and a rotation overlap location which overlaps with the wheel rotation axis as seen along the vertical direction in the straight travel state.

That is, when the travel path has a horizontal portion and a sloped portion, and when the carriage main body passes through the connecting area between the horizontal portion and the sloped portion, the timing at which the wheel passes through the connecting area and the timing at which the restriction member passes through the connecting area can be made close to each other by changing the position of the restriction member to the rotation overlap location which overlaps with the wheel rotation axis as seen along the vertical direction in the straight travel state. Thus, it can be made difficult for the restriction member to move up and down with respect to the travel surface, making it difficult for the restriction member to disengage from the guide rail along the vertical direction.

And since the position of the restriction member can be changed between the pivot overlap location and the rotation overlap location, the position of the restriction member can be changed to the position that is suitable for the shape or form of the travel rail and the guide rail. For example, the position of the restriction member can be changed to the pivot overlap location when it is easy for the wheel to derail from the travel rail, for example, because the travel rail is narrow in the carriage lateral direction. And the position of the restriction member can be changed to the rotation overlap location when it is easy for the restriction member to disengage from the guide rail, for example, because the restriction member is located near the upper end of the guide rail.

In an embodiment of the article transport facility in accordance with the present invention, each of the plurality of transport carriage preferably includes a restriction member for restricting movement of the carriage main body along the carriage lateral direction by contacting a guide rail provided along the travel path, wherein the restriction member is preferably provided at a rotation overlap location which overlaps with the wheel rotation axis as seen along a vertical direction.

That is, when the travel path has a horizontal portion and a sloped portion, and when the carriage main body passes through the connecting area between the horizontal portion and the sloped portion, the timing at which the wheel passes through the connecting area and the timing at which the restriction member passes through the connecting area can be made close to each other because the restriction member is provided at the rotation overlap location which overlaps with the wheel rotation axis as seen along a vertical direction in the straight travel state. Thus, it can be made difficult for the restriction member to move up and down with respect to the travel surface, making it difficult for the restriction member to disengage from the guide rail along the vertical direction.

In an embodiment of the article transport facility in accordance with the present invention, the plurality of transport carriages preferably form the carriage sequence of a loop shape in which the plurality of transport carriages are connected together along the travel path formed in a loop shape.

That is, since the carriage sequence is formed in a sloop shape, articles can be always continuously transported by the plurality of transport carriages; thus, the articles can be transported efficiently.

In an embodiment of the article transport facility in accordance with the present invention, the travel path preferably includes a horizontal portion in which the transport carriage assumes a horizontal attitude, and a sloped portion in which the transport carriage assumes a head-low or a tail-low attitude.

That is, even when the height of the transport origin is different from the height of the transport destination for transporting the articles, it can be made easy to transport articles from the transport origin to the transport destination. In addition, since the wheel and the carriage pivot axis of the first connecting portion overlap as seen along the carriage lateral direction, the article transport carriage can travel with sufficient stability even in the connecting area in which the horizontal portion and the sloped portion are connected to each other.

In an embodiment of the article transport facility in accordance with the present invention, the first connecting portion is preferably configured such that a connection position thereof to a forward end portion of the carriage main body can be adjusted along the carriage fore-and-aft direction within a range in which the wheel and the carriage pivot axis overlap with each other as seen along the carriage lateral direction.

That is, the distance, between the carriage main body of a transport carriage itself and the carriage main body of another transport carriage that is immediately in front, can be adjusted by adjusting the connection position of the first connecting portion to the forward end portion of the carriage main body along the carriage fore-and-aft direction, thus making it possible to adjust the length of the carriage sequence.

Especially when the carriage sequence is formed in a loop shape, the length of the carriage sequence may end up being longer, or shorter, than the length that corresponds to the looped transporting path due to manufacturing errors and installation errors, etc. However, by adjusting the length of the carriage sequence as described above, the length of the carriage sequence can be made to match the length that corresponds to the length of the transporting path.

In addition, although the position of the carriage pivot axis is moved along the carriage fore-and-aft direction when the connection position of the first connecting portion is adjusted along the carriage fore-and-aft direction, this movement is performed within the range in which the wheel and the carriage pivot axis overlap as seen along the carriage lateral direction; thus, it can be made difficult for the first connection portion to move up and down with respect to the travel surface, making it possible for the transport carriage to travel with sufficient stability even when the connection position of the first connecting portion is adjusted along the carriage fore-and-aft direction.

BRIEF DESCRIPTION OF THE DRAWINGS

FIG. 9 shows the positions of the wheel and a restriction member at a pivot overlap location,
FIG. 10 is a side view showing the positions of the wheel and the restriction member at a rotation overlap location.

MODES FOR CARRYING OUT THE INVENTION

The embodiments of the present invention are described next with reference to the drawings.

Figure 1:
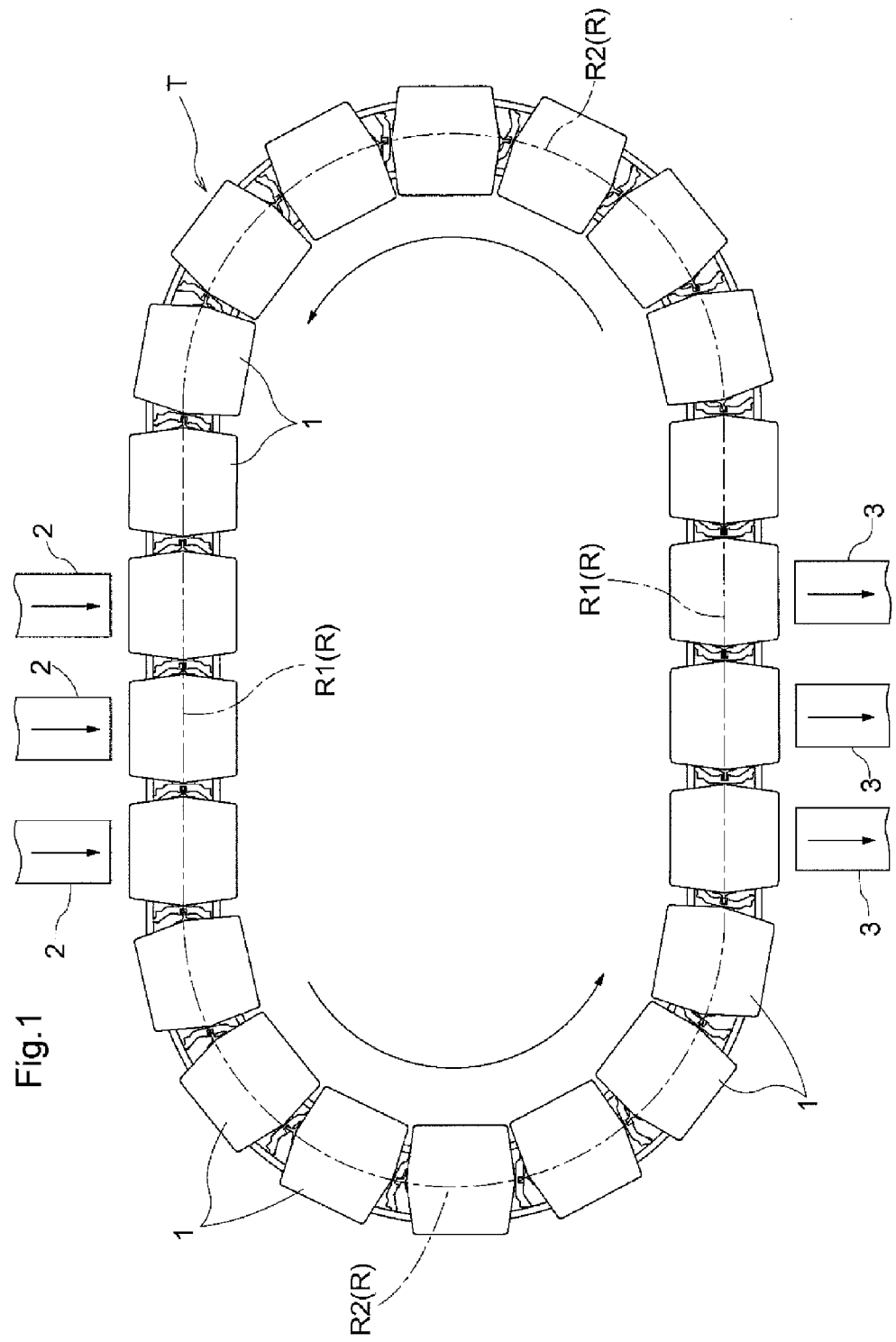
FIG. 1 is a plan view of an article transport facility.

As shown in FIG. 1, an article transport facility includes a carriage sequence T which is a plurality of transport carriages 1—which can travel along a travel path R which is formed to be a loop—that are connected together along the travel path R, first transport portions 2 for delivering articles to the transport carriages 1, and second transport portions 3 for receiving articles from the transport carriages 1. Incidentally, in the present embodiment, the articles are luggage of various sizes, such as a suitcase and a traveling bag, etc. and the article transport facility is installed in an airport.

And the first transport portions 2 consist of transport devices such as belt conveyors or roller conveyors, having sloped surfaces that are lower toward the travel path R, and are configured to be moved in the directions indicated by the arrows in the drawing through operation of a transport device to deliver articles to the transport carriages 1 located adjacent the first transport portions 2.

The second transport portions 3 consist of slopes or roller conveyors, having sloped surfaces that are higher toward the travel path R, and are configured to allow the articles to move under their own weight in the directions indicated by the arrows in the figure to move articles received from the transport carriages 1 located adjacent the second transport portions 2 toward areas outside the drawing.

A plurality of the first transport portions 2 and a plurality of the second transport portions 3 are provided along the travel path R.

The transport carriages 1 form the carriage sequence T which is formed into a loop and which is a plurality of transport carriages 1 connected along the travel path R. And this looped carriage sequence T is configured to travel along the travel path R.

And the article transport facility is configured such that an article transported by one of the plurality of first transport portions 2 is delivered to one of the plurality of transport carriages 1, and the transport carriage 1 that received the article travels along the travel path R to deliver the article to one of the plurality of the second transport portions 3.

The travel path R is formed into a loop by combining a pair of linear, or straight, horizontal portions R1, and a pair of curved sloped portions R2. The pair of linear horizontal portions R1 are arranged to be at mutually different heights: and the pair of the linear horizontal portions R1 are arranged to be horizontal along the travel direction of the transport carriages 1 and to be linear, or straight, in plan view. In addition, the pair of curved sloped portions R2 are arranged to be sloped along the travel direction of the transport carriages 1 and to be curved in plan view such as to connect, to each other, the pair of linear horizontal portions R1 at different heights. As such, the travel path R includes the linear horizontal portions R1 and the curved sloped portions R2.

Incidentally, the linear horizontal portions R1 are, or correspond to, horizontal portions in which the transport carriages 1 assume horizontal attitude or orientation whereas the curved sloped portions R2 are, or correspond to, sloped portions in which the transport carriages 1 assume a head-low or a tail-low attitude. The horizontal attitude is one in which the travel direction (vehicle fore and aft direction X described later) of the transport carriage 1 is parallel to the horizontal plane. In addition, the head-low attitude is one in which the travel direction of the transport carriage 1 is sloped, or tilted, with respect to the horizontal plane such that the front side thereof is lower than the back side thereof whereas the tail-low attitude is one in which the travel direction of the transport carriage 1 is sloped, or tilted, with respect to the horizontal plane such that the front side thereof is higher than the back side thereof.

In addition, the linear path located in the upper portion in FIG. 1 is arranged to be at a position higher than the linear path located in the lower portion of FIG. 1. And since the transport carriage 1 travels counterclockwise along the travel path R in FIG. 1, the curved sloped portion R2 located on the right-hand side in FIG. 1 is sloped upward whereas the curved sloped portion R2 located on the left-hand side in FIG. 1 is sloped downward.

While additional description of the transport carriage 1 is provided next, since each of the plurality of the transport carriages 1 that form the carriage sequence T is identically constructed, only one of the transport carriages 1 is described.

Incidentally, in the description, the direction parallel to the travel direction of the transport carriage 1 will be referred to as the carriage fore-and-aft direction X whereas the horizontal direction that is perpendicular to the carriage fore-and-aft direction X will be referred to as the carriage lateral direction Y. The expressions, "vehicle fore-and-aft direction X" and "carriage lateral direction Y" may be omitted at times in the description. For example, the forward end portion, with respect to the carriage fore-and-aft direction X, and the back end portion, with respect to the carriage fore-and-aft direction X, of the transport carriage 1 may, at times, simply be referred to as the forward end portion and the back end portion, respectively. And both end portions, with respect to the carriage lateral direction Y, and the central portion, with respect to the carriage lateral direction Y, of the transport carriage 1 may, at times, simply be referred to as both end positions and the central portion respectively.

Figure 2:
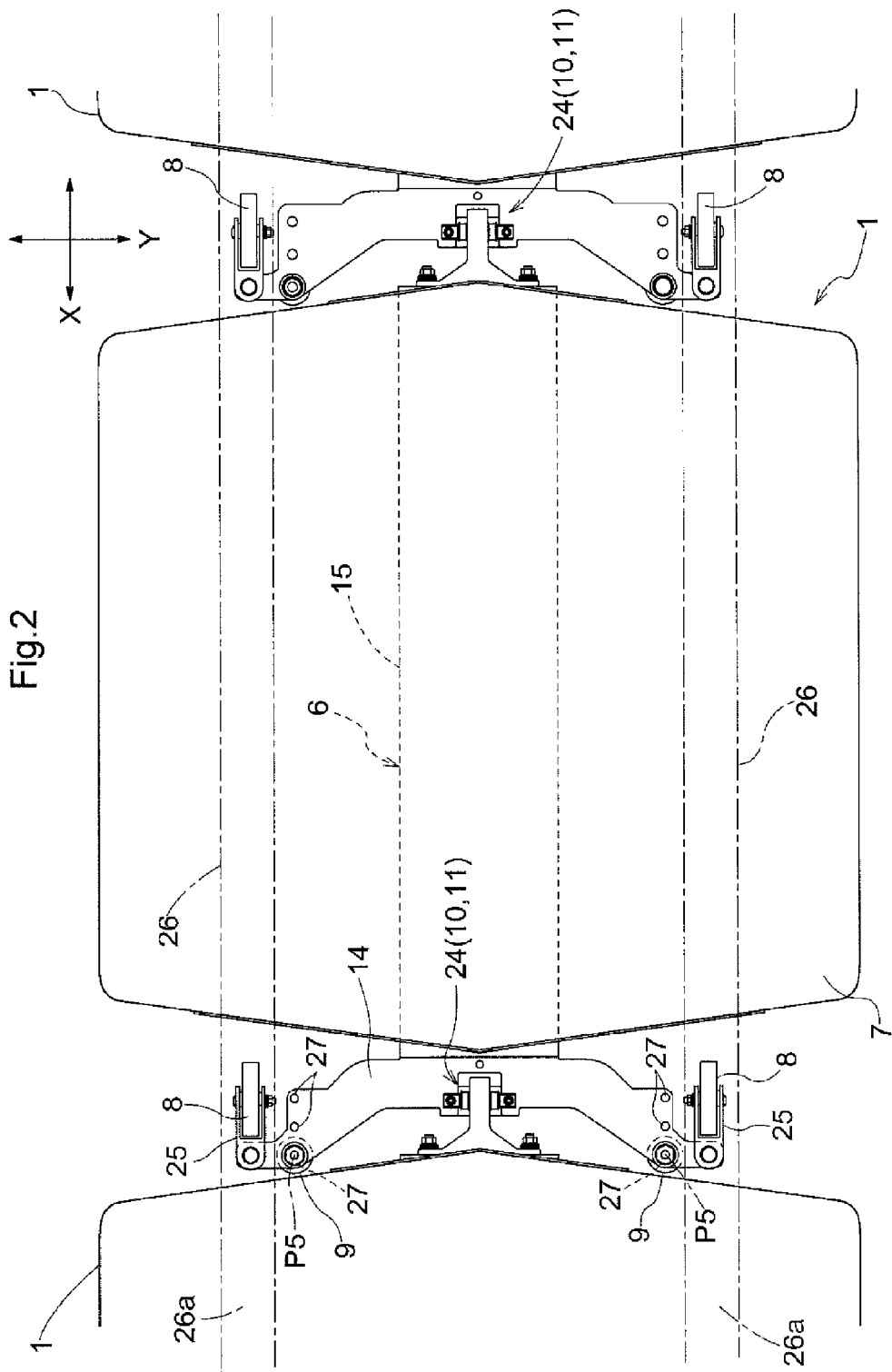
FIG. 2 is a plan view of a transport carriage.

As shown in FIG. 2, the transport carriage 1 includes a carriage main body 6, a support platform 7 for supporting an article, with the support platform 7 being supported by the carriage main body 6 above the carriage main body 6, wheels 8 which roll on the travel surfaces 26a formed along the travel path R, restriction members 9 for restricting movement of the carriage main body 6 along the carriage lateral direction Y, the first connecting portion 10 provided in a forward end portion of the carriage main body 6, and the second connecting portion 11 provided in a back end portion of the carriage main body 6.

[Support Platform]

Figure 3:
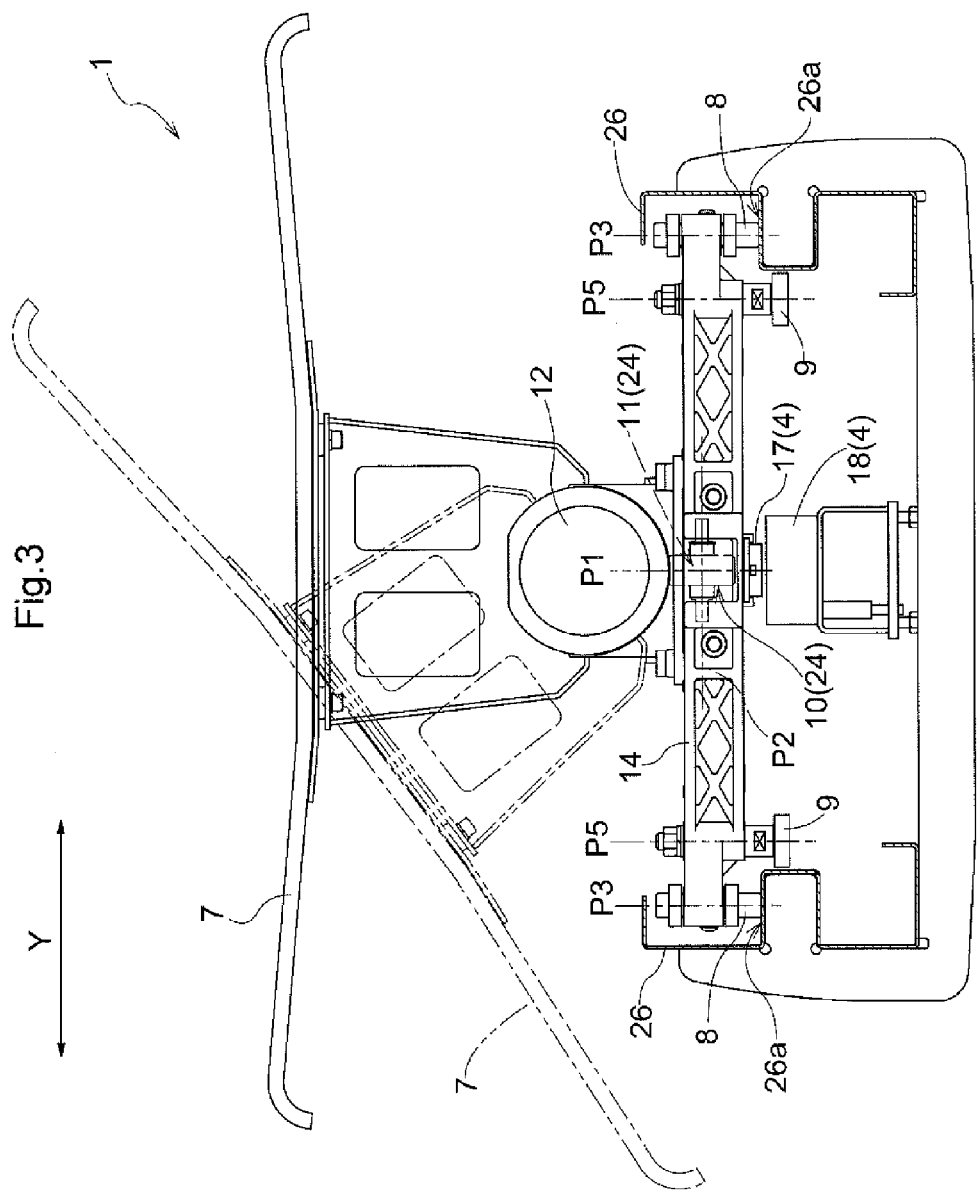
FIG. 3 is a front view of the transport carriage.

As shown in FIG. 3, the support platform 7 is configured to be switched, through actuation of an attitude switching motor 12, between a support attitude (attitude shown with solid lines), and a delivery attitude (attitude shown with dotted lines) in which the support platform 7 is pivoted from the support attitude about an axis that is parallel to the carriage fore-and-aft direction X. The support attitude is an attitude in which an article can be held on the support platform 7. And the transport carriage 1 is configured to receive an article from the first transport portion 2 with the support platform 7 in the support attitude. In addition, the delivery attitude is a tilted attitude so as to allow the article to move on the support platform 7 in the carriage lateral direction Y under the article's own weight. And the transport carriage 1 is configured to switch the support platform 7 to its delivery attitude to deliver the article on the support platform 7 to the second transport portion 3.

[Carriage Main Body]

Figure 4:
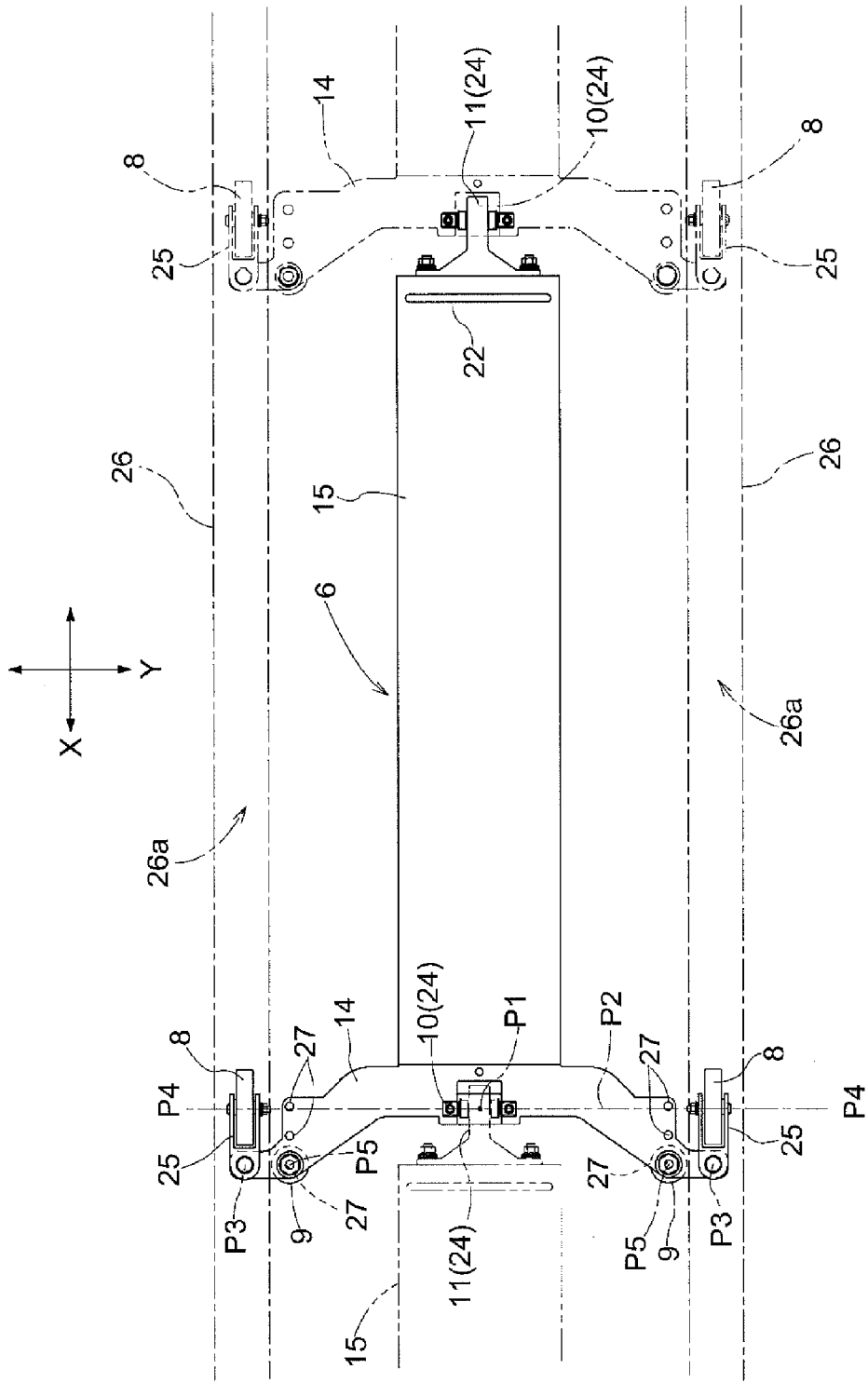
FIG. 4 is a plan view of a carriage main body.

As shown in FIG. 4, the carriage main body 6 includes a lateral frame 14 having an attitude in alignment with the carriage lateral direction Y, and a fore-and-aft frame 15 having an attitude in alignment with the carriage fore-and-aft direction X. In other words, the lateral frame 14 is formed to extend along the carriage lateral direction Y whereas the fore-and-aft frame 15 is formed to extend along the carriage fore-and-aft direction X. The lateral frame 14 is provided to the forward end portion, with respect to the carriage fore-and-aft direction X, of the carriage main body 6. And the central portion, with respect to the carriage lateral direction Y, of the lateral frame 14 is connected to the forward end portion, with respect to the carriage fore-and-aft direction X, of the fore-and-aft frame 15. In other words, the carriage main body 6 is formed to have a T-shape formed by the lateral frame 14 and the fore-and-aft frame 15.

In addition, the lateral frame 14 is formed in a shape with bends such that its central portion with respect to the carriage lateral direction Y is positioned rearwardly of its both end portions with respect to the carriage lateral direction Y. More specifically, the central portion and both end portions of the lateral frame 14 are formed to have shapes that are parallel to the carriage lateral direction Y in plan view whereas the portions of the lateral frame 14 that connect the central portion with both end portions are formed to have shapes that are inclined with respect to the carriage lateral direction Y in plan view.

Thus, by forming the lateral frame 14 in such a manner, the forward end portion of the carriage main body 6 is formed to have a concave shape with its central portion with respect to the carriage lateral direction Y being located rearwardly of the both end portions.

[Driving Device]

Figure 5:
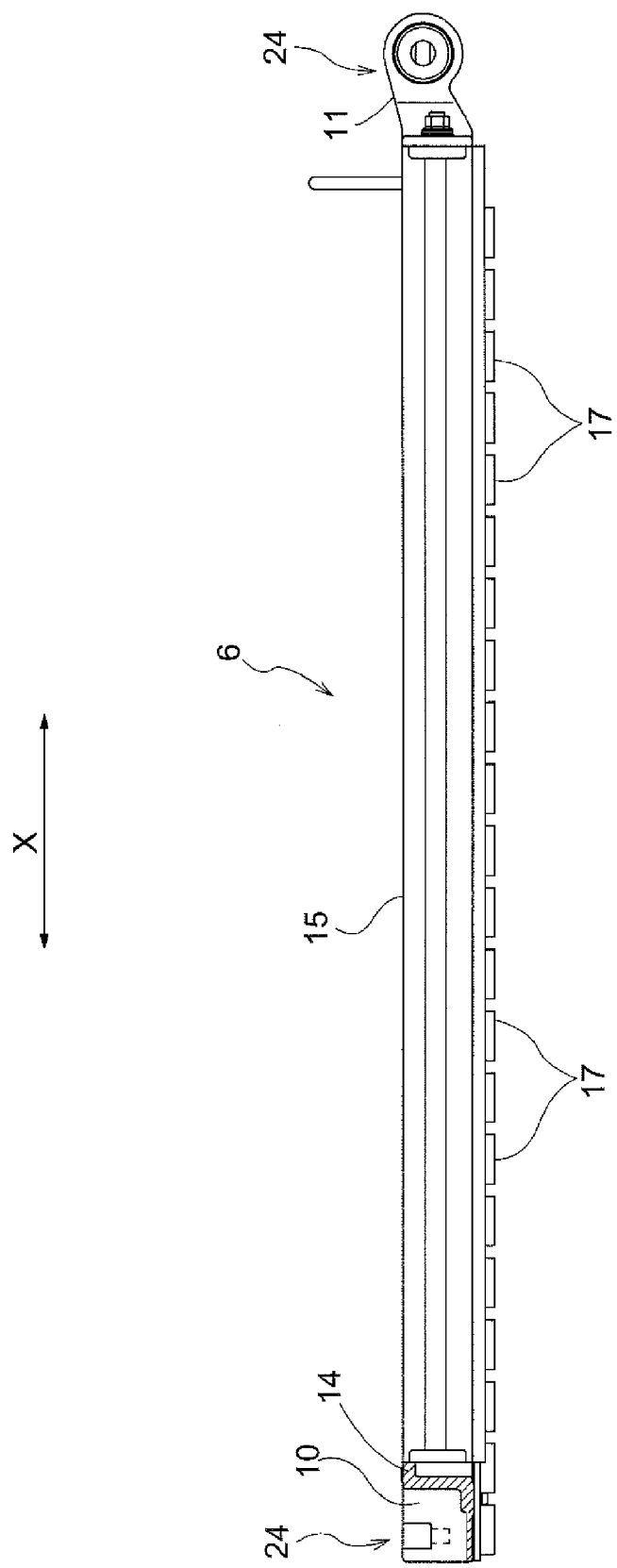
FIG. 5 is a side view of the carriage main body.
Figure 6:
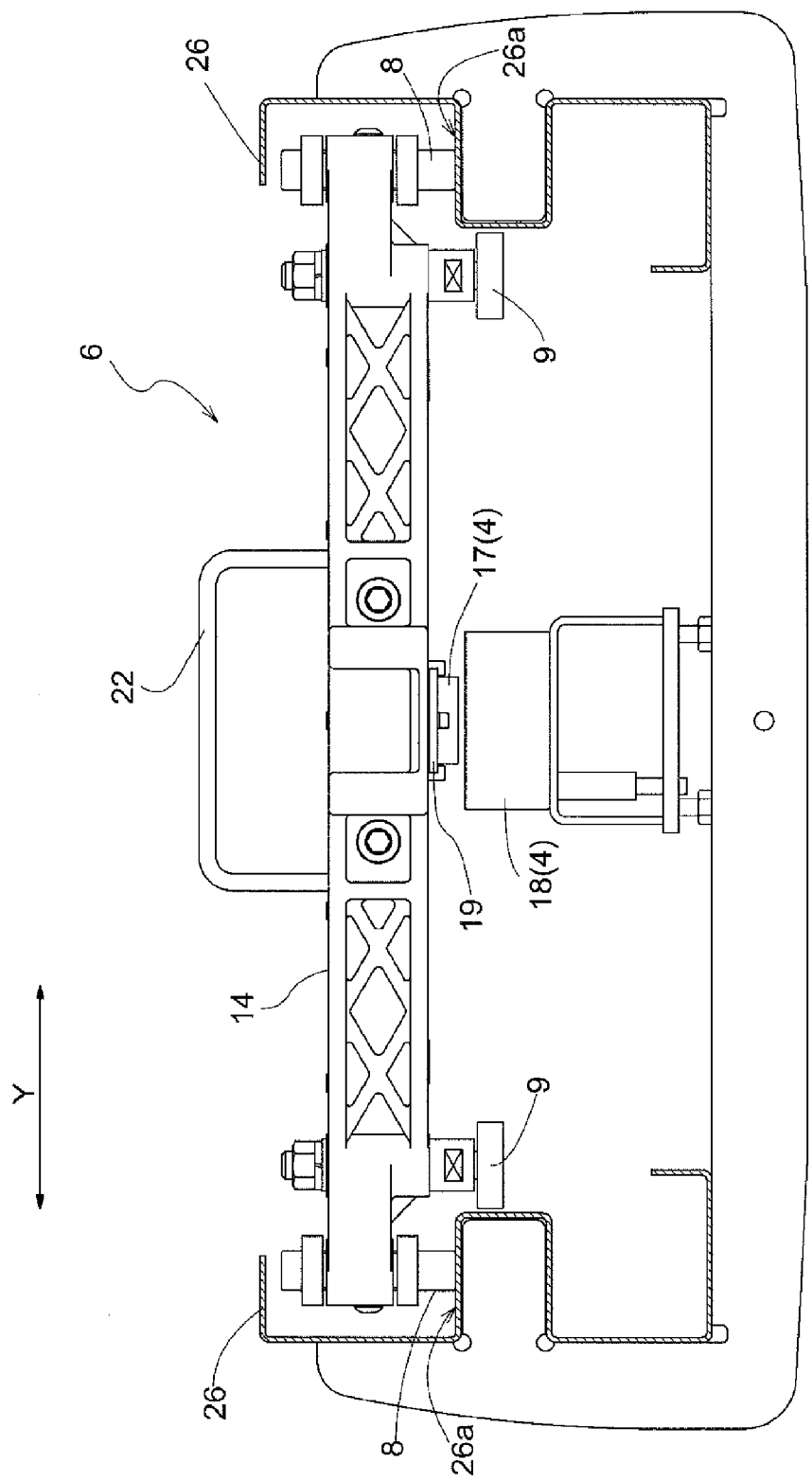
FIG. 6 is a front view of the carriage main body.

As shown in FIG. 5 and FIG. 6, the transport carriage 1 is provided with a plurality of magnets (permanent magnets) 17 such that they are spaced apart from each other along the carriage fore-and-aft direction X. And a linear motor 18 is provided on the ground side. The driving device 4 which causes the carriage sequence T to travel along the travel path R consists of the plurality of magnets 17 and the linear motor 18. Incidentally, the linear synchronous motor is provided as the linear motor 18.

As shown in FIG. 5, the plurality of magnets 17 are arranged parallel to each other and spaced apart from each other along the carriage fore-and-aft direction X such that the polarity that appears on the undersurface of each magnet 17 alternates, such as from South pole to North pole to South pole. And even number of the magnets 17 are provided.

And as shown in FIG. 6, the plurality of magnets 17 are fixedly attached to a long tap plate 19 with the magnets arranged in a line, and are attached to the underside of the carriage main body 6 with the magnets arranged in a line along the carriage fore-and-aft direction X by attaching the tap plate 19 to the undersurface portion of the carriage main body 6 with the tap plate 19 extending along the carriage fore-and-aft direction X.

Figure 7:
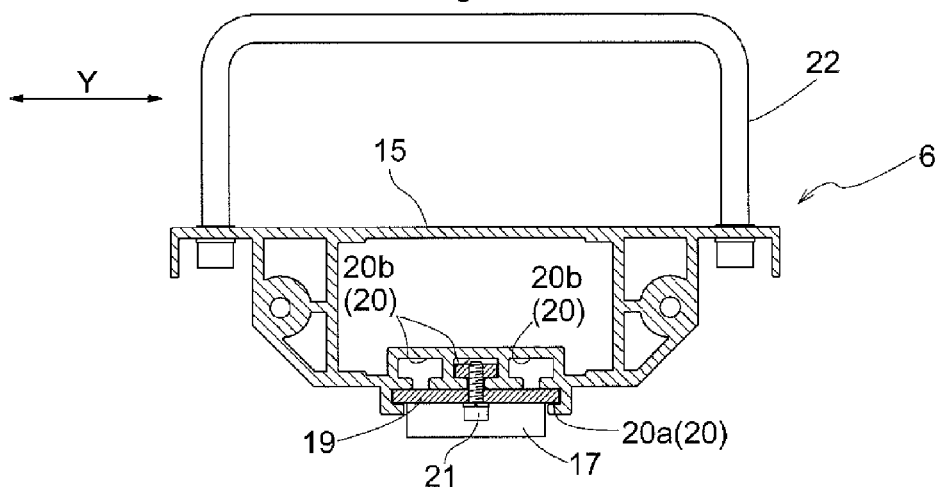
FIG. 7 is a front view of a fore-and-aft frame of the carriage main body.

As shown in FIG. 7, the tap plate 19 is attached making use of grooves 20 formed in the lower end portion of the carriage main body 6. These grooves 20 are formed to have a dovetail groove 20a for plate for inserting the tap plate 19 from the end thereof along the carriage fore-and-aft direction X, and dovetail groove 20b for connectors for inserting connectors 21, such as a nut for fixing the tap plate 19 from the end thereof along the carriage fore-and-aft direction X.

The dovetail groove 20a for plate is formed in the carriage main body 6 to open downwardly. The dovetail groove 20b for connectors are formed upwardly of the dovetail groove 20a for plate and are formed in the carriage main body 6 such that they are in communication with the dovetail groove 20a for plate.

And the tap plate 19 is inserted into the dovetail groove 20a for plate and the tap plate 19 is fixed to the carriage main body 6 using the connectors 21 inserted into the dovetail grooves 20b for connectors.

A plurality of dovetail grooves 20b for connectors are formed along the carriage lateral direction Y. And the tap plate 19 is fixed to the carriage main body 6 using one or more dovetail grooves 20b for connectors out of the plurality of dovetail grooves 20b for connectors. Incidentally, in the present embodiment, the dovetail grooves 20b for connectors are formed in three locations. And the tap plate 19 is fixed to the carriage main body 6 using only the dovetail groove 20b for connectors located in the center of these three dovetail grooves 20b for connectors.

A wiring fixing frame 22 is provided in the back end portion of the carriage main body 6. This frame 22 is provided in the back end portion of the fore-and-aft frame 15 such that it projects upwardly from the top surface of the fore-and-aft frame 15, and is formed to have an inverted U-shape as seen along the carriage fore-and-aft direction X. And by installing the wiring (such as electricity supply lines for power supply and communication lines for communication, etc., that are installed between a transport carriage itself and another transport carriage 1 that is immediately behind it) through the frame 22, it becomes difficult for the wiring to scatter in the vertical direction or the carriage lateral direction Y.

[Connecting Portion]

The transport carriage 1 is connected to another transport carriage 1 that is immediately in front of it and to another transport carriage 1 which is immediately behind it by means of connecting units 24. The connecting unit 24 consists of a first connecting portion 10 to be connected to the forward end portion of a transport carriage 1, and a second connecting portion 11 to be connected to the back end portion of a transport carriage 1.

In other words, a transport carriage itself is connected to another transport carriage 1 that is immediately in front, by connecting the first connecting portion 10 of a connecting unit 24 to the forward end portion of the transport carriage itself, and by connecting the second connecting portion 11 of a connecting unit 24 to the back end portion of the another transport carriage 1 that is immediately in front. In addition, a transport carriage itself is connected to another transport carriage 1 that is immediately behind, by connecting the second connecting portion 11 of the connecting unit 24 to the back end portion of the transport carriage itself, and by connecting the first connecting portion 10 of the connecting unit 24 to the front end portion of the another transport carriage 1 that is immediately behind.

And the first connecting portion 10 and the second connecting portion 11 of the connecting unit 24 are connected to each other such that they are pivotable about a carriage pivot axis P1 extending along the vertical direction and about a carriage pivot axis P2 extending along the carriage lateral direction Y. Thus, the first connecting portion 10 connected to the forward end portion of the transport carriage itself is connected to the second connecting portion 11 of another transport carriage 1 that is immediately in front such that they are pivotable about the carriage pivot axis P1 and about the carriage pivot axis P2. Note that the first carriage pivot axis P1 is, or corresponds to, a carriage pivot axis extending along the vertical direction, of the present invention.

The first connecting portion 10 is located in a central portion, with respect to the carriage lateral direction Y, and in the forward end portion, with respect to the carriage fore-and-aft direction X, of the carriage main body 6, and is connected to the top surface of a central portion, with respect to the carriage lateral direction Y, of the lateral frame 14. The first connecting portion 10 so located is located such as to overlap with the forwardmost magnet 17 among the plurality of magnets 17 as seen along the vertical direction.

In addition, the second connecting portion 11 is located in the central portion, with respect to the carriage lateral direction Y, and in the back end portion, with respect to the carriage fore-and-aft direction X, of the carriage main body 6, and is connected to a back surface of the fore-and-aft frame 15.

The first connecting portion 10 is configured to be able to adjust its connection position, along the carriage fore-and-aft direction X, to the forward end portion of the carriage main body 6 within the range in which the wheels 8 and the first carriage pivot axis P1 overlap with each other as seen along in the carriage lateral direction.

To describe in more detail, a connection hole (not shown) used when connecting the first connecting portion 10 to the forward end portion of the carriage main body 6 using a bolt and a nut, etc. is formed in the first connecting portion 10 of the connecting unit 24. The connection hole is formed at a position that is displaced, along the carriage fore-and-aft direction X, with respect to the first carriage pivot axis P1. More specifically, the center of the connection hole is displaced, along the carriage fore-and-aft direction X, by 0.5 mm with respect to the first carriage pivot axis P1.

Figure 8:
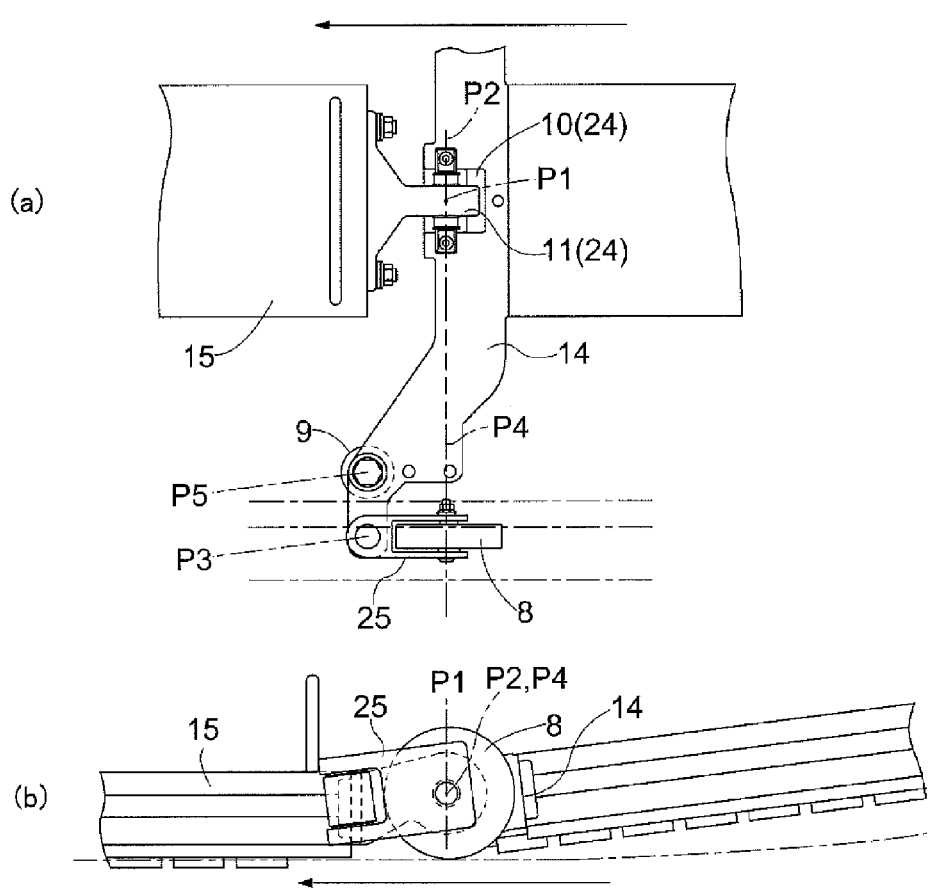
FIG. 8 shows positions of a wheel and a first connecting portion.

In addition, the connecting unit 24 is configured such that the first connecting portion 10 can be connected to the forward end portion of the carriage main body 6 of the transport carriage itself and the second connecting portion 11 can be connected to the back end portion of the carriage main body 6 of another transport carriage 1 that is immediately in front, even in the state (referred to as the "inverted state") in which only the second connecting portion 11 is rotated about the second carriage pivot axis P2 by 180 degrees after rotating the entire connecting unit 24 about the second carriage pivot axis P2 by 180 degrees from the state shown in FIG. 8 (referred to as the "normal state").

And the connection hole is moved along the carriage fore-and-aft direction X by rotating the entire connecting unit 24 (the first connecting portion 10) about the second carriage pivot axis P2 to achieve the inverted state. Thus, the position of the first connecting portion 10 with respect to the carriage main body 6 is different along the carriage fore-and-aft direction X between the normal state and the inverted state. And by switching the connecting unit 24 between the normal state and the inverted state, the connection position of the first connecting portion 10 with respect to the forward end portion of the carriage main body 6 can be adjusted along the carriage fore-and-aft direction X.

Although the position of the first carriage pivot axis P1 is also moved along the carriage fore-and-aft direction X when the connection position of the first connecting portion 10 is adjusted along the carriage fore-and-aft direction X, the amount of movement of the carriage pivot axis P1 is twice the amount of displacement of the first carriage pivot axis P1 with respect to the center of the connection hole, which is 1 mm in the present example; thus, the adjustment of the connection position of the first connecting portion 10 is performed within the range in which the wheels 8 and the first carriage pivot axis P1 overlap with each other as seen along the carriage lateral direction.

[Wheels]

Transport carriage 1 has caster frames 25 which are connected to the carriage main body 6 for pivoting about respective wheel pivot axes P3 extending along the vertical direction when the transport carriage 1 is in the horizontal attitude (i.e., when it is located in the linear horizontal portion R1). And each caster frame 25 rotatably supports the wheel 8 such that a wheel rotation axis P4 which is the rotation axis of the wheel 8 is displaced horizontally with respect to the wheel pivot axis P3. Since the wheel rotation axis P4 is displaced horizontally with respect to the wheel pivot axis P3 as described above, the direction of the wheel 8 is changed as the travel direction of the transport carriage 1 changes in plan view between when traveling in the linear horizontal portion R1 and when traveling in the curved sloped portion R2.

And the caster frame 25 and the wheel 8 supported thereby are provided in the forward end portion, with respect to the carriage fore-and-aft direction X, and to each of the both end portions, with respect to the carriage lateral direction Y, of the carriage main body 6.

As such, a pair of the caster frame 25 and the wheel 8 combinations are provided to the carriage main body 6. And a pair of travel rails 26 on which the wheels 8 roll on are provided for the pair of wheels 8. Each of the pair of travel rails 26 is provided along the travel path R, and a travel surface 26a on which the wheel 8 rolls on is formed on the top surface of the travel rail 26.

The caster frame 25 is provided such that the wheel 8 and the first carriage pivot axis P1 of the first connecting portion 10 overlap with each other as seen along the carriage lateral direction (see FIG. 8), when in a straight travel state (attitude shown in FIGS. 2 and 3) in which the wheel rotation axis P4 is located rearwardly of the wheel pivot axis P3 and in which the wheel rotation axis P4 is oriented parallel to the carriage lateral direction Y. In other words, in the straight travel state, the wheel rotation axis P4 for the wheel 8 is located on the extension of the second carriage pivot axis P2 in plan view; and, the first carriage pivot axis P1 and the wheel 8 overlap with each other as seen along the carriage lateral direction. In other words, in the straight travel state, the position of the first carriage pivot axis P1 along the carriage fore-and-aft direction X is within the area the wheel 8 is located along the carriage fore-and-aft direction X.

Figure 11:
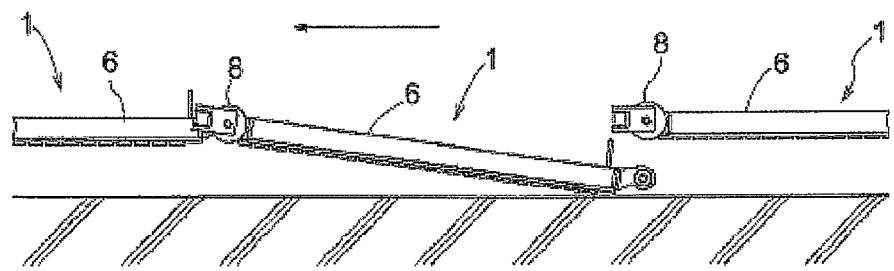
FIG. 11 is a side view showing the state where a connection between the transport carriages, that are adjacent to each other in the front and back direction, is disengaged.
Figure 12:
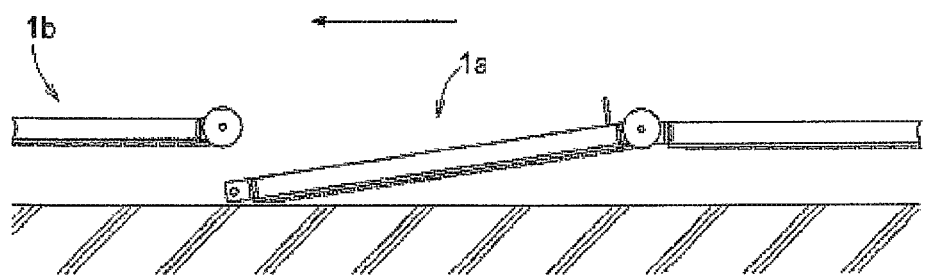
FIG. 12 is a side view showing the state where a connection between the transport carriages, that are adjacent to each other in the front and back direction, is disengaged, in a conventional art.
Figure 13:
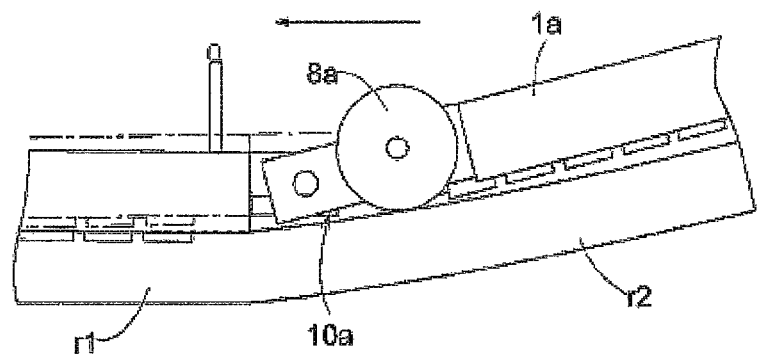
FIG. 13 is a side view showing the positions of the wheel and the first connecting portion in a conventional art.

By providing the wheels 8 in the forward end portion of the carriage main body 6 as described above, dropping of the forward end portion of the carriage main body 6 can be avoided since the forward end portion of the carriage main body 6 is supported by the wheels 8 even when the connection to another transport carriage 1 that is immediately in front is disengaged. In addition, when the connection to another transport carriage 1 that is immediately behind is disengaged, the carriage main body 6 comes to assume a tail-low attitude as shown in FIG. 11; thus, the back end portion of the carriage main body 6 runs over the unevenness, etc., on the floor surface after the front end portion of the carriage main body 6 travels past it. And so, the carriage main body 6 can avoid being thrusted into the unevenness, etc., as it comes into contact with it even when the carriage main body 6 comes into contact with it.

And the wheels 8 and the first carriage pivot axis P1 of the first connecting portion 10 overlap with each other as seen along the carriage lateral direction; thus, when the transport carriage 1 travels through a connecting area between a linear horizontal portion R1 and a curved sloped portion R2, the timing at which the wheels 8 pass through the connecting area and the timing at which the first carriage pivot axis P1 of the first connecting portion 10 passes through the connecting area can be made close to each other; therefore, it becomes difficult for the first connecting portion 10 to move up and down with respect to the travel surface 26a, which makes it possible for the transport carriage 1 to travel with sufficient stability.

[Restriction Members]

The transport carriage 1 is provided with restriction members 9 for restricting movement of the transport carriage 1 along the carriage lateral direction Y by contacting the travel rail 26.

Each restriction member 9 consists of a rotating body which can be rotated about a restrict pivot axis P5 extending along the vertical direction, and is provided such that it is in contact with the inward surface of the travel rail 26 with respect to the carriage lateral direction Y. Note that the travel rails 26 are, or correspond to, the guide rails provided along the travel path R.

The restriction members 9 are removably provided to the carriage main body 6. And a plurality of holes 27 for attaching the restriction member 9 to the carriage main body 6 are formed along the fore and aft direction. And when installing the restriction member 9 to the carriage main body 6, the position of the restriction member 9 along the carriage fore-and-aft direction X can be changed, by selecting the hole 27 to which it is installed, to any of a pivot overlap location (location shown in FIG. 8 (a) and FIG. 9) which overlaps with the wheel pivot axis P3 in the straight travel state as seen along the carriage lateral direction; a rotation overlap location (location shown in FIG. 10) which overlaps with the wheel rotation axis P4 in the straight travel state as seen along the vertical direction; and an intermediate location (not shown) which is located between the wheel pivot axis P3 and the wheel rotation axis P4 and which does not overlap with either of these wheel pivot axes P3 and the wheel rotation axis P4. That is, when the restriction member 9 is attached at the pivot overlap location, the position of the wheel pivot axis P3 along the carriage fore-and-aft direction X is within the area in which the restriction member 9 is located along the carriage fore-and-aft direction X, in the straight travel state. And when the restriction member 9 is attached at the rotation overlap location, the position of the wheel rotation axis P4 along the carriage fore-and-aft direction X is within the area in which the restriction member 9 is located along the carriage fore-and-aft direction X, in the straight travel state.

The restriction member 9 is provided to be rotatable about a restriction member pivot axis P5 extending along the vertical direction.

And as shown in FIG. 9, the restriction member 9 and the wheel pivot axis P3 become close to each other by attaching the restriction member 9 at the pivot overlap location; thus, the amount of pivoting of the caster frame 25 about the wheel pivot axis P3 can be reduced even when the travel direction of the transport carriage 1 changes. This makes it more difficult for the wheels 8 to sway along the carriage lateral direction Y, making it more difficult for the wheels 8 to derail from the travel rails 26.

In addition, as shown in FIG. 10, by attaching the restriction member 9 at the rotation overlap location, when the transport carriage 1 travels through the connecting area between a linear horizontal portion R1 and a curved sloped portion R2, the timing at which the wheels 8 pass through the connecting area and the timing at which the restriction members 9 pass through the connecting area can be matched to each other; thus, it becomes more difficult for the restriction members 9 to move up and down with respect to the travel surface 26a, making it more difficult for the restriction members 9 disengaged from the travel rails 26 along the vertical direction.

Alternative Embodiments (1) In the embodiment described above, the first carriage pivot axis P1 and the wheels 8 are arranged to overlap with each other as seen along the carriage lateral direction by locating the first carriage pivot axis P1 on the extension of the wheel rotation axis P4. However, the first carriage pivot axis P1 and the wheels 8 may be arranged to overlap with each other as seen along the carriage lateral direction while the wheel rotation axis P4 is located rearwardly of the first carriage pivot axis P1 along the carriage fore-and-aft direction X. Alternatively, the first carriage pivot axis P1 and the wheels 8 may be arranged to overlap with each other as seen along the carriage lateral direction while the wheel rotation axis P4 is located forwardly of the first carriage pivot axis P1 along the carriage fore-and-aft direction X.

In other words, the wheels 8 only need to be so located to overlap with the first carriage pivot axis P1 as seen along the carriage lateral direction. More specifically, assuming that the radius of the wheel 8 is 50 mm, it is only required that the amount of displacement between the wheel rotation axis P4 and the first carriage pivot axis P1 along the carriage fore-and-aft direction X be less than or equal to 50 mm. In addition, taking into consideration the pitch between the wheels 8 (1200 mm in the present example) in the carriage sequence T along the carriage fore-and-aft direction X, it is desirable to reduce the amount of displacement between the wheel rotation axis P4 and the first carriage pivot axis P1 along the carriage fore-and-aft direction X to less than or equal to 20 mm.

(2) In the embodiment described above, the forward end portion of the carriage main body 6 is formed to have a concave shape; however, the shape of the carriage main body 6 may be changed as appropriate. More specifically, the lateral frame 14 is formed to have a linear shape in alignment with the carriage lateral direction Y, for example, so that the forward end portion of the carriage main body 6 is linear in shape.

In this case, the wheels 8 and the first carriage pivot axis P1 may be positioned to overlap with each other as seen along the carriage lateral direction by shifting the first connecting portion 10 toward the back, or by shifting the wheels 8 toward the front.

(3) In the embodiment described above, the location of the restriction member 9 can be changed to the pivot overlap location, the intermediate location, or to the rotation overlap location; however, arrangement may be made so that the position of the restriction member 9 may be changed to two of these three locations, or so that the restriction member 9 is provided at one location, that cannot be changed, among these three locations. More specifically, arrangement may be made so that the location of the restriction member 9 may be changed between only the pivot overlap location and the rotation overlap location, for example. Or, the restriction member 9 may be located at the pivot overlap location which cannot be changed.

(4) In the embodiment described above, the travel path R has a loop shape and the transport carriages 1 are caused to travel in one direction; however, the travel path R may be of a shape with ends and the transport carriages 1 may be caused to travel back and forth.

In addition, in the embodiment described above, the travel path R is formed into a loop by combining straight portions with curved portions; however, the travel path R may have only curved portions when forming the travel path R in a loop, the travel path R may have only straight portions when forming the travel path R in a shape with ends.

In short, in the embodiment described above, the travel path R is formed by combining straight portions and curved portions; however, the travel path R may be formed by combining, as appropriate, any of a linear horizontal portion R1, a curved sloped portion R2, a curved horizontal portion which is horizontal in the travel direction of the transport carriage 1 and which is curved in plan view, and a linear sloped portion which is sloped in the travel direction of the transport carriage 1 and which is straight in plan view.

(5) In the embodiment described above, the travel rails 26 are provided along the travel path R and the top surfaces of the travel rails 26 define the travel surfaces 26a on which the wheels 8 roll; however, the top surface of the floor may define the travel surface 26a on which the wheels 8 roll, without providing the travel rails 26.

In addition, in the embodiment described above, the restriction members 9 contact the side faces of the travel rails 26 so that the travel rails 26 also function as guide rails; however, guide rails may be provided separately from the travel rails 26.

(6) In the embodiment described above, each wheel 8 is provided so that it can pivot about the wheel pivot axis P3; however, the wheels 8 may be provided such that they cannot be pivoted.

(7) In the embodiment described above, the distance between the carriage main body 6 of the transport carriage itself and the carriage main body 6 of another transport carriage 1 that is immediately in front is adjusted by adjusting the connection position of the first connecting portion 10 with respect to the forward end portion of the carriage main body 6 along the carriage fore-and-aft direction X; however, the distance between the carriage main body 6 of the transport carriage itself and the carriage main body 6 of another transport carriage 1 that is immediately in front may be adjusted by adjusting the connection position of the second connecting portion 20 with respect to the back end portion of the carriage main body 6 along the carriage fore-and-aft direction X.

In addition, in the embodiment described above, the amount of adjustment of the connection position with respect to the forward end portion of the carriage main body 6 of the first connecting portion 10 is set to be 1 mm; however, this amount of adjustment only needs to be within the range of 0.1 mm-10 mm, for example as appropriate, and is acceptable so long as the amount of adjustment does not fall outside the range in which the wheels and the carriage pivot axis overlap with each other as seen along the carriage lateral direction by adjusting the connection position of the first connecting portion 10.

DESCRIPTION OF REFERENCE NUMERALS AND SYMBOLS

1 Transport Carriage
4 Driving Device
6 Carriage Main Body
8 Wheel
9 Restriction Member
10 First Connecting Portion
11 Second Connecting Portion
25 Caster Frame
26 Travel Rail (Guide Rail)
26a Travel Surface
R Travel Path
R1 Horizontal Portion
R2 Sloped Portion
T Carriage sequence
P1 Carriage Pivot Axis
P3 Wheel Pivot Axis
P4 Wheel Rotation Axis
X Carriage Fore-and-aft Direction
Y Carriage Lateral Direction

The invention claimed is:

1. An article transport facility comprising:
a carriage sequence which is a plurality of transport carriages, for transporting articles, connected together along a travel path, the plurality of transport carriages being capable of traveling along the travel path; and
a driving device for causing the carriage sequence to travel along the travel path;
wherein each of the plurality of transport carriages includes a carriage main body, a wheel which rolls on a travel surface formed along the travel path, a first connecting portion provided to a forward end portion of the carriage main body, and a second connecting portion provided to a back end portion of the carriage main body,
wherein the first connecting portion is connected to the second connecting portion of another transport carriage that is immediately in front so as to be pivotable about a carriage pivot axis extending along a vertical direction,
wherein the wheel is provided in the forward end portion of the carriage main body,
wherein the wheel and the carriage pivot axis of the first connecting portion overlap with each other as seen along a carriage lateral direction, and
wherein the wheel has a wheel rotation axis, which is a rotation axis of the wheel and located at a different position in a different direction relative to the carriage pivot axis.

2. The article transport facility as defined in claim 1, wherein each of the plurality of transport carriages includes a caster frame which is connected to the carriage main body such that the caster frame is rotatable about a wheel pivot axis which extends along the vertical direction when the transport carriage is in a horizontal attitude,
wherein the caster frame rotatably supports the wheel with the wheel rotation axis located at a different position along a horizontal direction from the wheel pivot axis, and
wherein, when the caster frame is in a straight travel state in which the wheel rotation axis is located rearwardly of the wheel pivot axis and in which the wheel rotation axis is in an attitude that is parallel to the carriage lateral direction, the wheel and the carriage pivot axis overlap with each other as seen along the carriage lateral direction.

3. The article transport facility as defined in claim 2, wherein the caster frame is provided to each of both end portions of the carriage main body with respect to the carriage lateral direction,
wherein the first connecting portion is provided in a central portion, along the carriage lateral direction, of the carriage main body, and
wherein the forward end portion of the carriage main body is formed to have a concave shape in which the central portion along the carriage lateral direction is located rearwardly of the both end portions.

4. The article transport facility as defined in claim 2, wherein a travel rail is provided along the travel path, a top surface of the travel rail defining the travel surface,
wherein each of the plurality of transport carriage includes a restriction member for restricting movement of the carriage main body along the carriage lateral direction by contacting a guide rail provided along the travel path, and
wherein the restriction member is provided at a pivot overlap location which overlaps with the wheel pivot axis as seen along the carriage lateral direction, in the straight travel state.

5. The article transport facility as defined in claim 4, wherein the restriction member is provided such that a position thereof along a carriage fore-and-aft direction can be changed between the pivot overlap location, and a rotation overlap location which overlaps with the wheel rotation axis as seen along the vertical direction in the straight travel state.

6. The article transport facility as defined in claim 2, wherein each of the plurality of transport carriage includes a restriction member for restricting movement of the carriage main body along the carriage lateral direction by contacting a guide rail provided along the travel path, and
wherein the restriction member is provided at a rotation overlap location which overlaps with the wheel rotation axis as seen along a vertical direction.

7. The article transport facility as defined in claim 1, wherein the plurality of transport carriages form the carriage sequence of a loop shape in which the plurality of transport carriages are connected together along the travel path formed in a loop shape.

8. The article transport facility as defined in claim 1, wherein the travel path includes a horizontal portion in which the transport carriage assumes a horizontal attitude, and a sloped portion in which the transport carriage assumes a head-low or a tail-low attitude.

9. The article transport facility as defined in claim 1, wherein the first connecting portion is configured such that a connection position thereof to a forward end portion of the carriage main body can be adjusted along the carriage fore-and-aft direction within a range in which the wheel and the carriage pivot axis overlap with each other as seen along the carriage lateral direction.

* * * * *